United States Patent
Cookson et al.

(10) Patent No.: US 8,878,908 B2
(45) Date of Patent: *Nov. 4, 2014

(54) 3-D AUTO-CONVERGENCE CAMERA (75) Inventors: Chris Cookson, Studio City, CA (US); George H. Joblove, Hollywood, CA (US); David L. Hays, Los Angeles, CA (US)

(73) Assignees: Sony Corporation, Tokyo (JP); Sony Pictures Entertainment Inc, Culver City, CA (US)

( * ) Notice: Subject to any disclaimer, the term of this patent is extended or adjusted under 35 U.S.C. 154(b) by 666 days.

This patent is subject to a terminal disclaimer.

(21) Appl. No.: 12/820,052

(22) Filed: Jun. 21, 2010

(65) Prior Publication Data

US 2011/0001798 A1 Jan. 6, 2011

Related U.S. Application Data (63) Continuation-in-part of application No. 12/649,218, filed on Dec. 29, 2009.

(60) Provisional application No. 61/222,829, filed on Jul. 2, 2009.

(51) Int. Cl.
H04N 13/02 (2006.01)
G03B 35/00 (2006.01)

(52) U.S. Cl.
CPC ........................................ G03B 35/00 (2013.01)
USPC ........................................................ 348/47

(58) Field of Classification Search
None
See application file for complete search history.

(56) References Cited

U.S. PATENT DOCUMENTS

| 5,737,655 | A | 4/1998 | Inaba |
| 6,748,105 | B1 | 6/2004 | Mancuso et al. |
| 2005/0117033 | A1 | 6/2005 | Matsui |
| 2006/0139371 | A1 | 6/2006 | Lavine et al. |
| 2007/0171524 | A1* | 7/2007 | Steinthal et al. ............... 359/466 |
| 2007/0237514 | A1* | 10/2007 | Pillman et al. ................. 396/153 |
| 2008/0088706 | A1* | 4/2008 | Girgensohn et al. ...... 348/207.99 |
| 2008/0156882 | A1* | 7/2008 | Tsikos et al. ............. 235/462.43 |
| 2008/0240704 | A1* | 10/2008 | Takahashi ..................... 396/419 |
| 2008/0316301 | A1 | 12/2008 | Givon |

FOREIGN PATENT DOCUMENTS

| CN | 101291120 A | 10/2008 |
| KR | 10-2009-0049563 | 6/2009 |
| KR | 10-2009-0080528 | 8/2009 |

OTHER PUBLICATIONS

Promotional Materials for Full Broadcast 3D HD Camera System, 2010.

* cited by examiner

*Primary Examiner* — Sath V Perungavoor
*Assistant Examiner* — Kate Luo
(74) *Attorney, Agent, or Firm* — Procopio, Cory, Hargreaves & Savitch, LLP (57) ABSTRACT

Automatically converging a plurality of images for use in a stereoscopic camera system including a plurality of 2-D cameras, the method including: receiving a focal distance from each 2-D camera of the plurality of 2-D cameras, wherein each 2-D camera includes at least one image sensor; calculating a system focal distance of the stereoscopic camera system by using focal distances received from the plurality of 2-D cameras; determining a center of interest using the calculated system focal distance of the stereoscopic camera system; and moving the at least one image sensor in each 2-D camera to adjust directions of view of the plurality of 2-D cameras to converge at the center of interest.

13 Claims, 11 Drawing Sheets

3-D AUTO-CONVERGENCE CAMERA

CROSS-REFERENCE TO RELATED APPLICATIONS

This application is a continuation-in-part application of U.S. patent application Ser. No. 12/649, 218, filed Dec. 29, 2009, entitled "3-D Auto-convergence Camera" (which claimed the benefit of priority under 35 U.S.C. §119(e) of U.S. Provisional Patent Application No. 61/222,829, filed Jul. 2, 2009). The disclosures of the above-referenced applications are incorporated herein by reference.

BACKGROUND

1. Field of the Invention

The present invention relates to a stereoscopic imaging system, and more specifically, to automatically converging images used in such a stereoscopic imaging system.

2. Background

Stereoscopic imaging systems provide synchronized presentation of different images to the left and right eyes of a user. Alignment of these different images by the left and right eyes is an important factor in the development of any stereoscopic imaging system. Some conventional systems include manual alignment in which an operator selects the input imaging parameters on a display unit, such as camera field of view and convergence distance. In these systems, a stereoscopic display could be designed to provide assistance in correctly aligning the display geometry to match the imaging geometry, either by automatically moving the display components, or providing visual feedback to the operator with test patterns that allow for accurate manual alignment. Some existing auto-alignment techniques include providing a left and right alignment pattern on the left-eye and right-eye image screens, and adjusting the displays to converge by moving display elements of the screens.

SUMMARY

Embodiments of the present invention provide for automatically converging a plurality of images for use in a stereoscopic camera system.

In one implementation, a method of automatically converging a plurality of images for use in a stereoscopic camera system including a plurality of 2-D cameras is disclosed. The method including: receiving a focal distance from each 2-D camera of the plurality of 2-D cameras, wherein each 2-D camera includes at least one image sensor; calculating a system focal distance of the stereoscopic camera system by using focal distances received from the plurality of 2-D cameras; determining a center of interest using the calculated system focal distance of the stereoscopic camera system; and moving the at least one image sensor in each 2-D camera to adjust directions of view of the plurality of 2-D cameras to converge at the center of interest.

In another implementation, a stereoscopic camera system for automatically converging a plurality of images is disclosed. The system including: a plurality of 2-D cameras including a first 2-D camera and a second 2-D camera, wherein the first 2-D camera comprises a first lens which captures and projects a first image of the plurality of images on a first image sensor, and the second 2-D camera comprises a second lens which captures and projects a second image of the plurality of images on a second image sensor; and a processor configured to: (1) receive and process focal distances of the plurality of images from the plurality of 2-D cameras to calculate a system focal distance of the stereoscopic camera system; (2) determine a center of interest using the calculated system focal distance of the stereoscopic camera system; and (3) move the first image sensor and the second image sensor to adjust directions of view of the plurality of 2-D cameras to converge at the center of interest.

In another implementation, a stereoscopic camera system for automatically converging a plurality of images is disclosed. The system including: a plurality of 2-D cameras, each 2-D camera comprising a lens which captures and projects an image onto an image sensor; and a processor configured to: (1) vertically move the image sensor in each 2-D camera to adjust for eccentricities of lenses in the plurality of 2-D cameras; (2) receive and process focal distances of the plurality of images to calculate a system focal distance of the stereoscopic camera system; (3) determine a center of interest using the calculated system focal distance of the stereoscopic camera system; and (4) horizontally move the image sensor in each 2-D camera to adjust directions of view of the plurality of 2-D cameras to converge at the center of interest.

In yet another implementation, a computer-readable storage medium storing a computer program for automatically converging a plurality of images for use in a stereoscopic camera system including a plurality of 2-D cameras is disclosed. The computer program includes executable instructions that cause a computer to: receive a focal distance from each 2-D camera of the plurality of 2-D cameras, wherein each 2-D camera includes at least one image sensor; calculate a system focal distance of the stereoscopic camera system by using focal distances received from the plurality of 2-D cameras; determine a center of interest using the calculated system focal distance of the stereoscopic camera system; and command the at least one image sensor in each 2-D camera to move to adjust directions of view of the plurality of 2-D cameras to converge at the center of interest.

Other features and advantages of the present invention will become more readily apparent to those of ordinary skill in the art after reviewing the following detailed description and accompanying drawings.

DETAILED DESCRIPTION

Certain implementations as disclosed herein provide for automatically converging images used in a stereoscopic imaging system. After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

Figure 1:
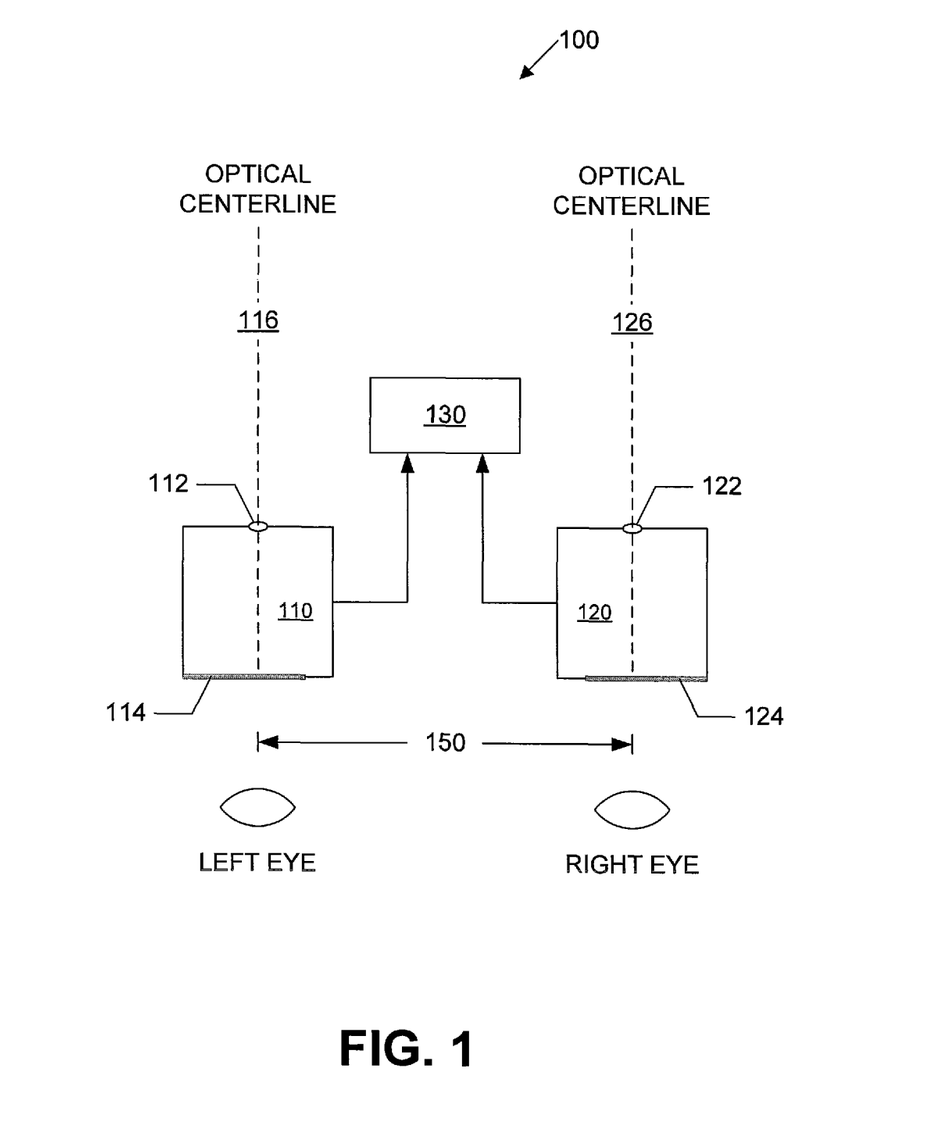
FIG. 1 shows a schematic view of a stereoscopic (e.g., 3-D) camera system including two 2-D cameras, each 2-D camera having a sensor-lens combination, in accordance with one implementation of the present invention.

FIG. 1 shows a schematic view of a stereoscopic (e.g., 3-D) camera system 100 including two 2-D cameras 110, 120, each 2-D camera having a sensor-lens combination. Although the illustrated implementation of FIG. 1 shows a "camera" configured as a combination of a single lens and a single sensor, in other implementations, the term "camera" can be used to refer to multiple lens/sensor combinations in a single unit or enclosure.

The 2-D camera 110 includes a lens 112 and an image sensor 114. The lens 112 captures and projects a field of view having an optical centerline 116 onto the image sensor 114. The 2-D camera 120 includes a lens 122 and an image sensor 124. The lens 122 captures and projects a field view having an optical centerline 126 onto the image sensor 124. The optical centerline 116 of the 2-D camera 110 is configured to be displaced an inter-pupillary distance 150 (e.g., approximately 6 to 7 centimeters) from the optical centerline 126 of the 2-D camera 120. Accordingly, in one implementation, the 2-D camera 110 is configured to capture and output an image for the left eye, while the 2-D camera 120 is configured to capture and output an image for the right eye. In the illustrated implementation of FIG. 1, the stereoscopic camera system 100 also includes a processor 130 that is configured to automatically converge the two images captured by the 2-D cameras 110, 120.

Figure 2:
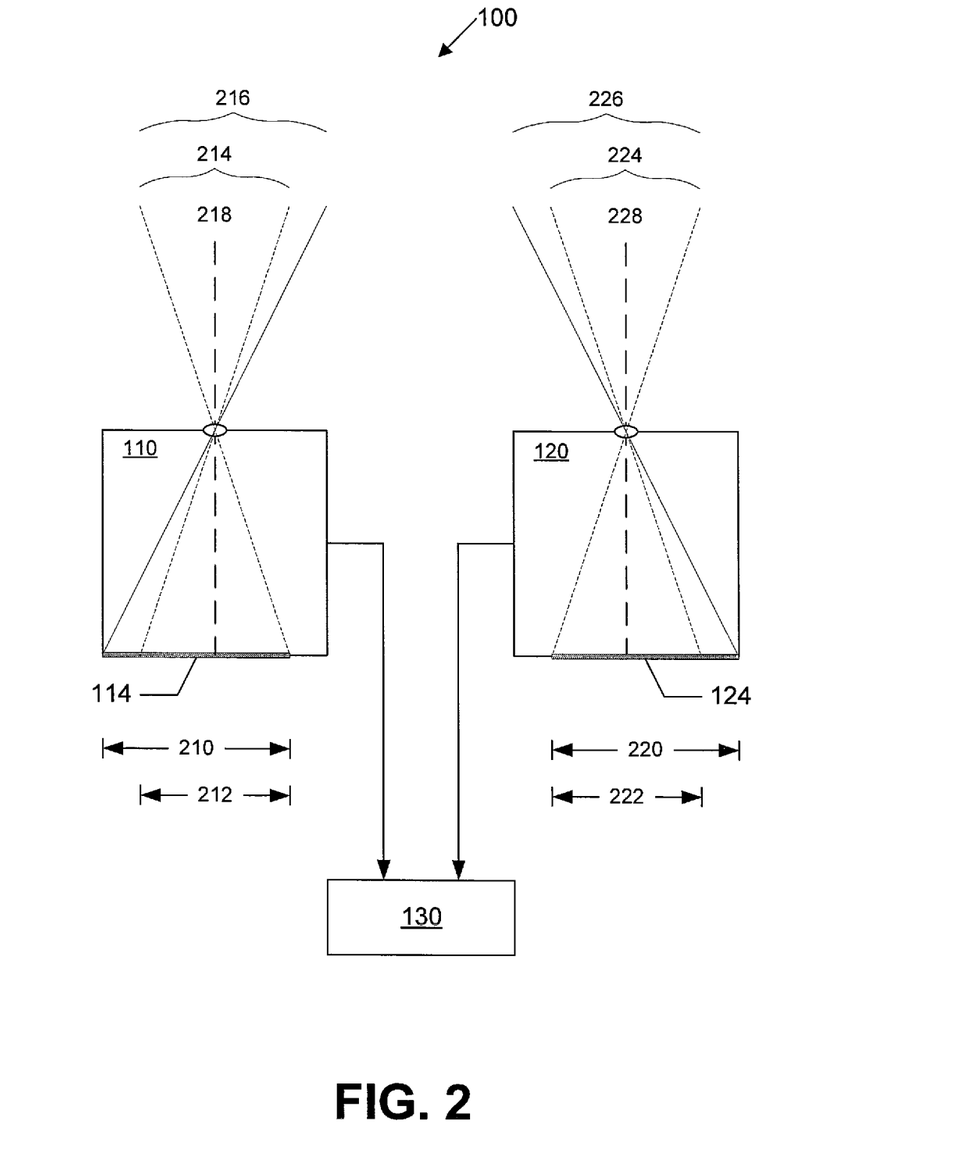
FIG. 2 shows another view of the stereoscopic camera system illustrated in FIG. 1 but including fields of view and effective sensor widths provided by cropping.

In one implementation shown in FIG. 1 and FIG. 2, the image sensors 114, 124 are horizontally offset from the optical centerlines 218, 228. In other implementations, the image sensors are not offset. In the illustrated implementation, the image sensor 114 is offset to the left to provide a full width 210, while the image sensor 124 is offset to the right to provide a full width 220. Therefore, a full field of view 216 or 226 of each sensor 110 or 120 is horizontally asymmetric with respect to the optical centerline 218 or 228 of the lens 112 or 122.

To yield images centered on the optical centerlines (e.g., 218, 228), the images can be horizontally cropped to provide parallel fields of view 214, 224. For example, the image projected on the image sensor 114 is "right cropped" to provide an effective sensor width 212 with a corresponding parallel field of view 214. Thus, the term "right cropped" refers to cropping a strip on the left side of the image projected on the image sensor 114. Furthermore, the image projected on the image sensor 124 is left cropped to provide an effective sensor width 222 with a corresponding parallel field of view 224. Thus, the term "left cropped" refers to cropping a strip on the right side of the image projected on the image sensor 124. In general terms, strips are cropped on far sides from the middle of the inter-pupillary distance to focus on distant objects, while the strips are cropped on near sides from the middle of the inter-pupillary distance to focus on near objects. Accordingly, the optical centerlines 218, 228 correspond to parallel lines of sight with substantially zero convergence. It is interesting to note that the cropped area defines a nominal resolution of the camera. In other implementations, the images can be cropped in patterns other than horizontal to provide convergence of multiple images into a single 3-D image (e.g., diagonally).

Figure 3:
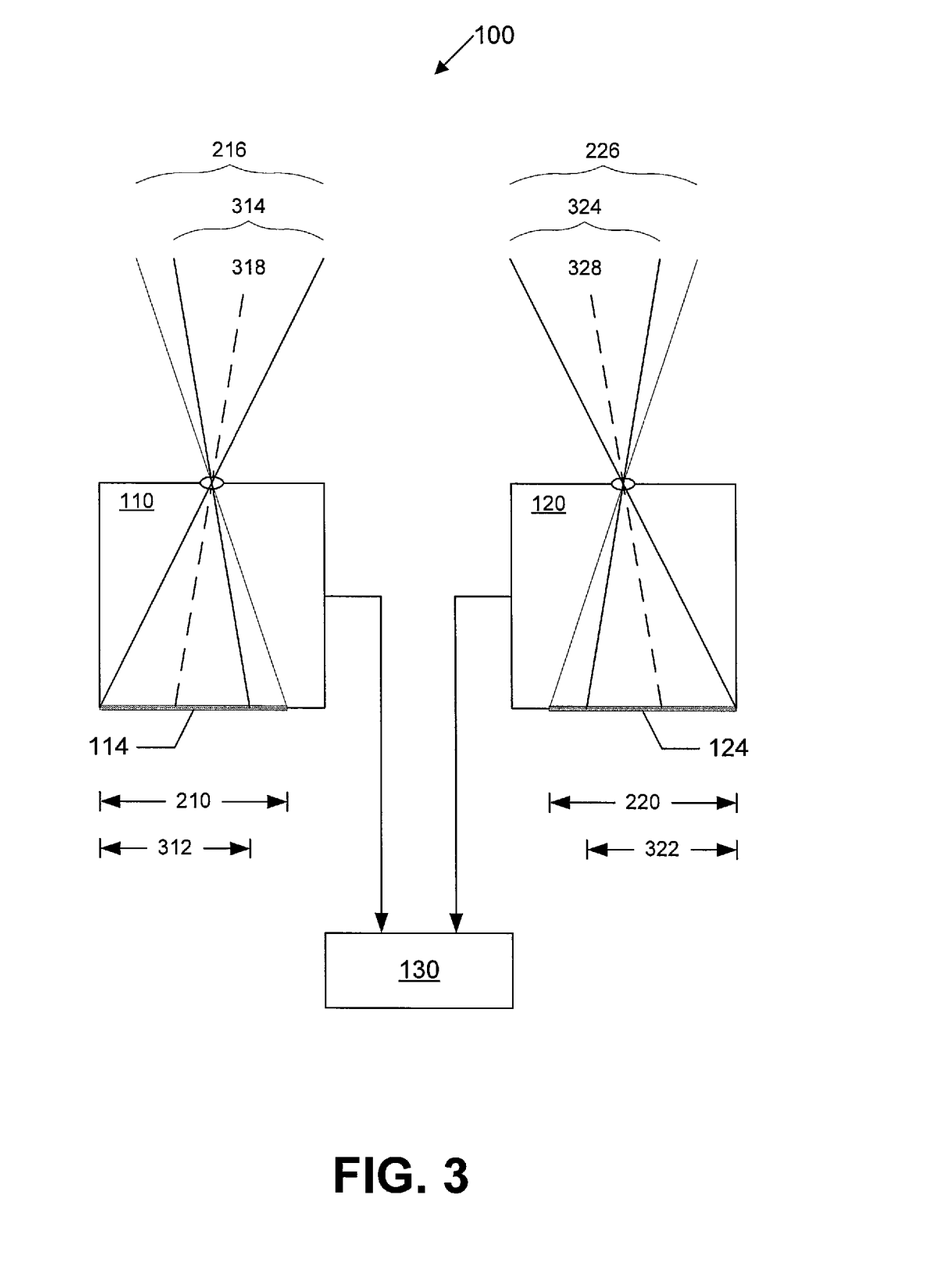
FIG. 3 shows the stereoscopic camera system of FIG. 1 showing converging optical centerlines.

FIG. 3 shows the stereoscopic camera system 100 with converging optical centerlines 318, 328. In the illustrated implementation of FIG. 3, the centerlines 318, 328 are controlled to converge by adjusting the cropping of the images captured by the image sensors rather than by adjusting the lenses of the cameras 110, 120. As discussed above, asymmetrically cropping an image can change both the field of view and the optical centerline of the image. For example, the image captured by the image sensor 114 is left cropped to provide an effective sensor width 312 with a corresponding "converged" field of view 314. Furthermore, the image captured by the image sensor 124 is right cropped to provide an effective sensor width 322 with a corresponding "converged" field of view 324.

Figure 4:
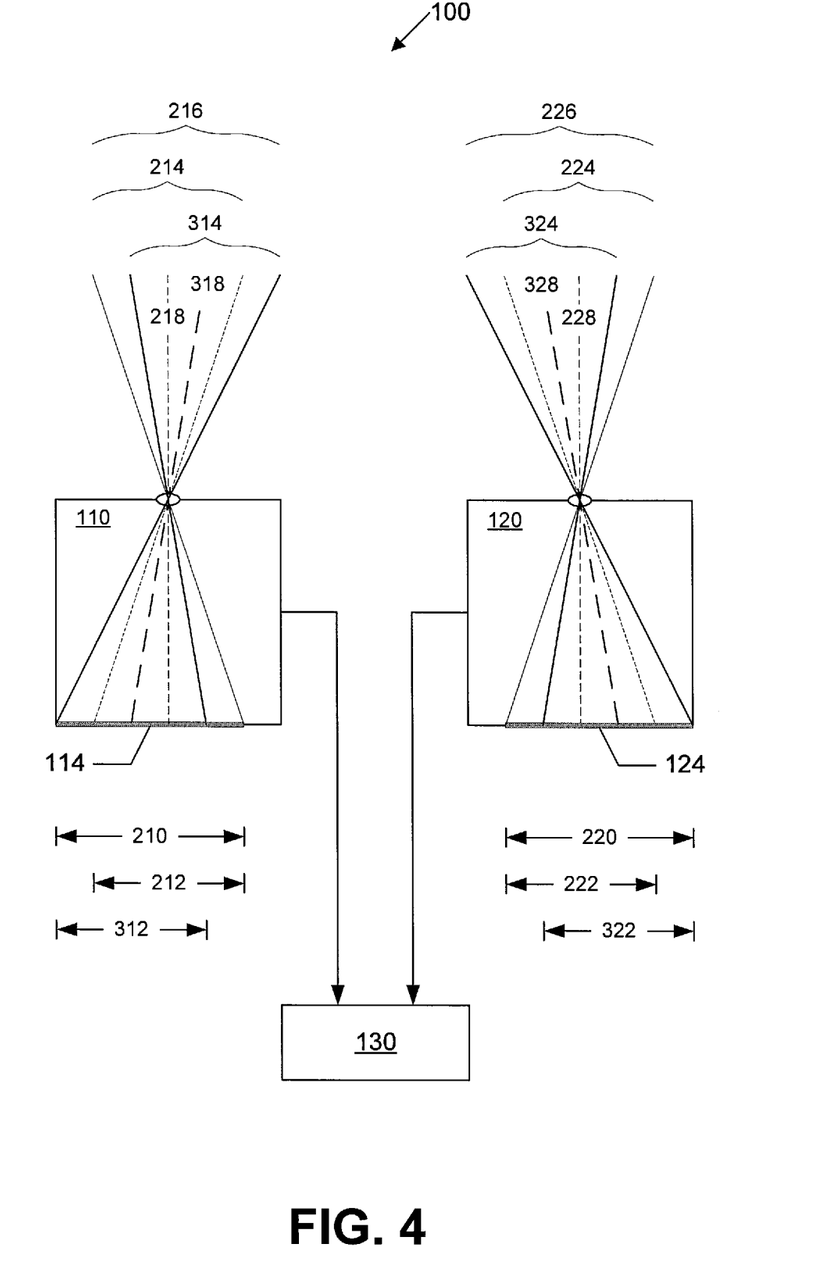
FIG. 4 shows the stereoscopic camera system of FIG. 1 further showing techniques for automatically converging the images.

In FIG. 4, the stereoscopic camera system 100 provides for automatically converging the images generated by the two 2-D cameras 110, 120, each 2-D camera having a sensor-lens combination. The automatic convergence of the images involves determining the center of interest and the depth plane using focal distances received from the two image sensor-lens combinations. The focal distance can be determined using an auto-focus mechanism, manual focus by a camera operator, or other focusing and/or measuring means external to the camera. In one implementation, each 2-D camera generates an image along with metadata including a focal distance. The focal distance is then extracted from the received metadata.

In one implementation, the center of interest is determined by averaging the focal distances of the two cameras 110, 120. In another implementation, the center of interest is determined by measuring a focal distance of a lens (not shown) at the middle between the two cameras 110, 120. Thus, by having the auto-convergence be driven by the focal distance of the camera, the center of interest can be maintained at screen depth in a stereoscopic image (e.g., a 3-D image). Further, this allows cuts and dissolves in a 3-D video to be comfortable to the eyes of the viewer.

In the illustrated implementation of FIG. 4, directions of view of the two cameras 110, 120 are controlled to converge at the center of interest by digitally adjusting the horizontal position of the crop of the two images rather than by the movement of the lenses. For example, the image projected on the image sensor 114 can be right cropped to focus on distant objects straight ahead (along the centerline 218) with a parallel field of view 214 (with an effective sensor width 212), or can be left cropped to focus on closer objects along the "converging" centerline 318 with a "converged" field of view 314 (with an effective sensor width 312). Furthermore, the image projected on the image sensor 124 can be left cropped to focus on distant objects straight ahead (along the centerline 228) with a parallel field of view 224 (with an effective sensor width 222), or can be right cropped to focus on closer objects along the "converging" centerline 328 with a "converged" field of view 324 (with an effective sensor width 322).

Figure 9:
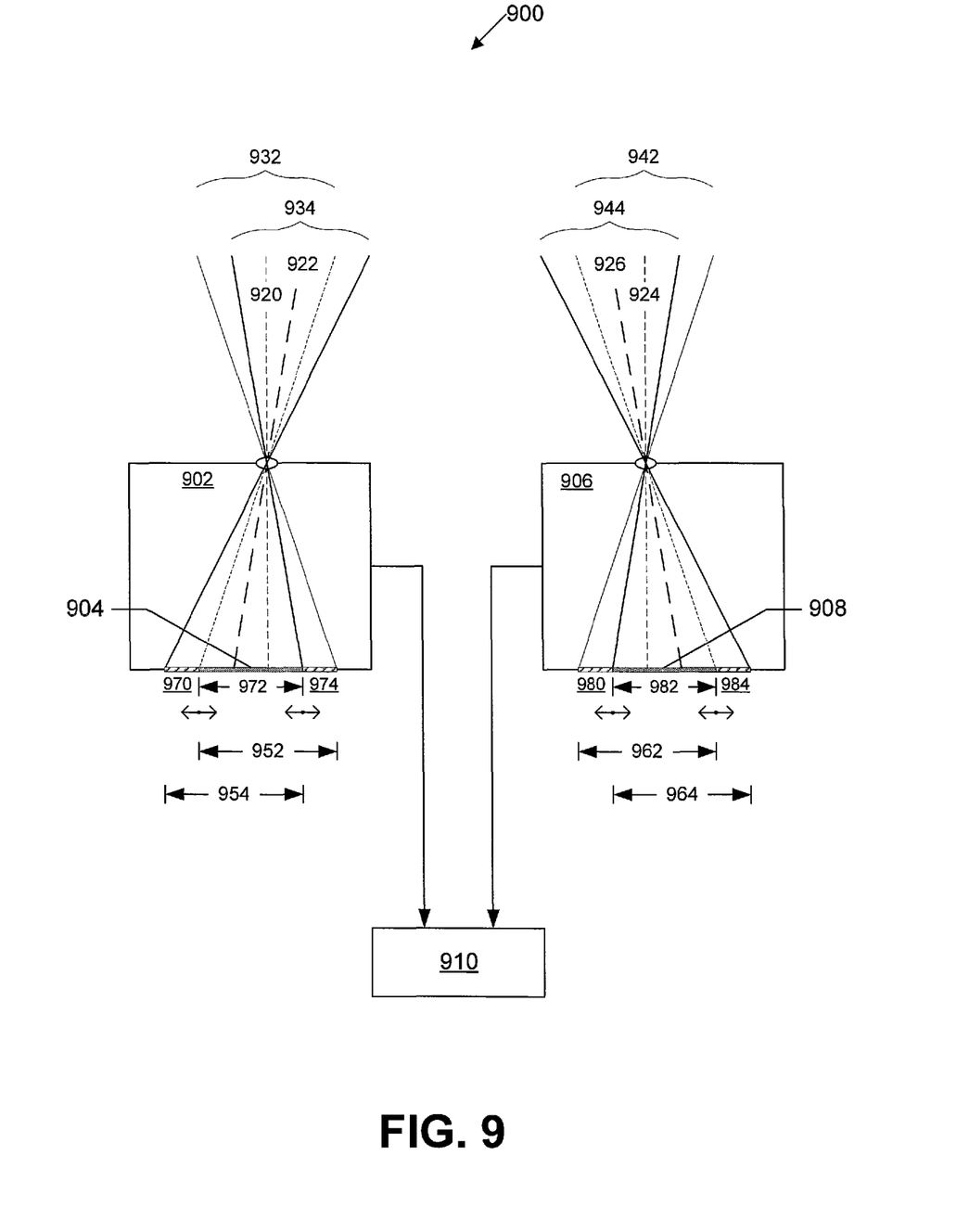
FIG. 9 shows a schematic view of a stereoscopic camera system including two 2-D cameras in accordance with an alternative implementation of the present invention.

In an alternative implementation shown in FIG. 9, directions of view of the two cameras 902, 906 are controlled to converge at the center of interest by sliding or moving the horizontal position of image sensors 904, 908. For example, for camera 902, the image is projected onto an image sensor 904 whose width extends across 972 and 974 to focus on distant objects straight ahead (along the centerline 920) with a parallel field of view 932 (with an effective sensor width 952). The focus can be adjusted to closer objects along the "converging" centerline 922 with a "converged" field of view 934 by moving or sliding the image sensor 904 to the left to slide the effective sensor width from 952 to 954. For camera 906, the image is projected onto an image sensor 908 whose width extends across 980 and 982 to focus on distant objects straight ahead (along the centerline 924) with a parallel field of view 942 (with an effective sensor width 962). The focus can be adjusted to closer objects along the "converging" centerline 926 with a "converged" field of view 944 by moving or sliding the image sensor 908 to the right to slide the effective sensor width from 962 to 964.

Figure 5:
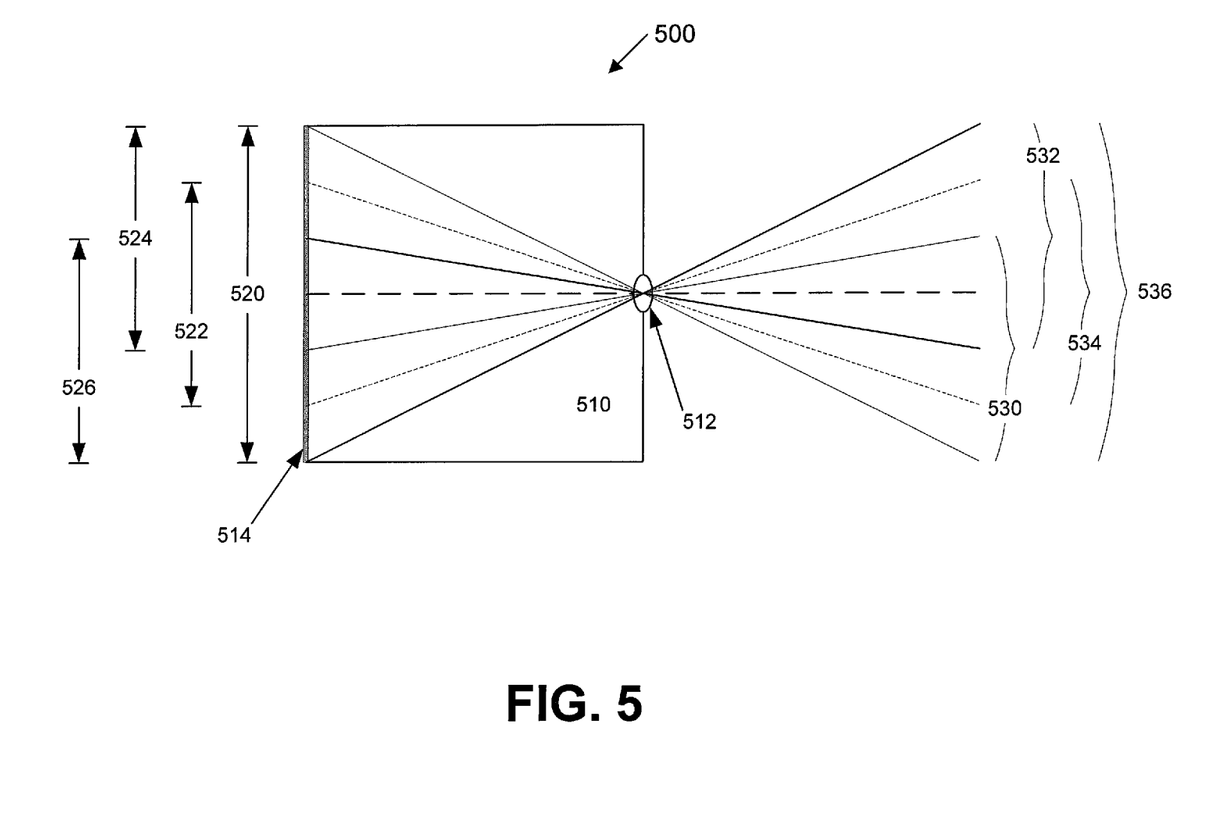
FIG. 5 shows a stereoscopic camera system in accordance with another implementation of the present invention.

FIG. 5 shows a stereoscopic camera system 500 in accordance with another implementation of the present invention. Although FIG. 5 shows only one 2-D camera 510, the digital manipulation of the image projected by a lens 512 on a sensor 514 is equally applicable to another 2-D camera (not shown). In the illustrated implementation of FIG. 5, a vertical adjustment of each eye's view is made possible by using a sensor similarly oversized in the vertical dimension, and by digitally adjusting the vertical position of the cropping. For example, an image can be: (1) center-cropped (providing an effective sensor width 522) to adjust a full field of view 536 down to a vertical field of view 534; (2) up-cropped (providing an effective sensor width 524) to adjust a full field of view 536 down to a vertical field of view 530; or (3) down-cropped (providing an effective sensor width 526) to adjust a full field of view 536 down to a vertical field of view 532.

A system similar to the stereoscopic camera system 500 (shown in FIG. 5) using above-described techniques of cropping (horizontal and/or vertical) can be used to control optical centerlines to adjust for eccentricities of a lens which causes positional variations during zooming. The ability to digitally adjust each eye's view horizontally and/or vertically enables the camera system to compensate for the positional variations caused by the lens eccentricities. In this implementation, the vertical cropping of an image is adjusted to compensate for lens eccentricities because the lens eccentricities cause mainly vertical position variations. However, the horizontal cropping of an image can also be used, in addition to the vertical cropping, to compensate for lens eccentricities which cause horizontal position variations. In one implementation, the camera system corrects for any lens eccentricity using a look-up table of crop values defined for the lens at various levels of zoom. The crop values include horizontal and/or vertical crop values needed to correct the lens eccentricity.

Figure 10:
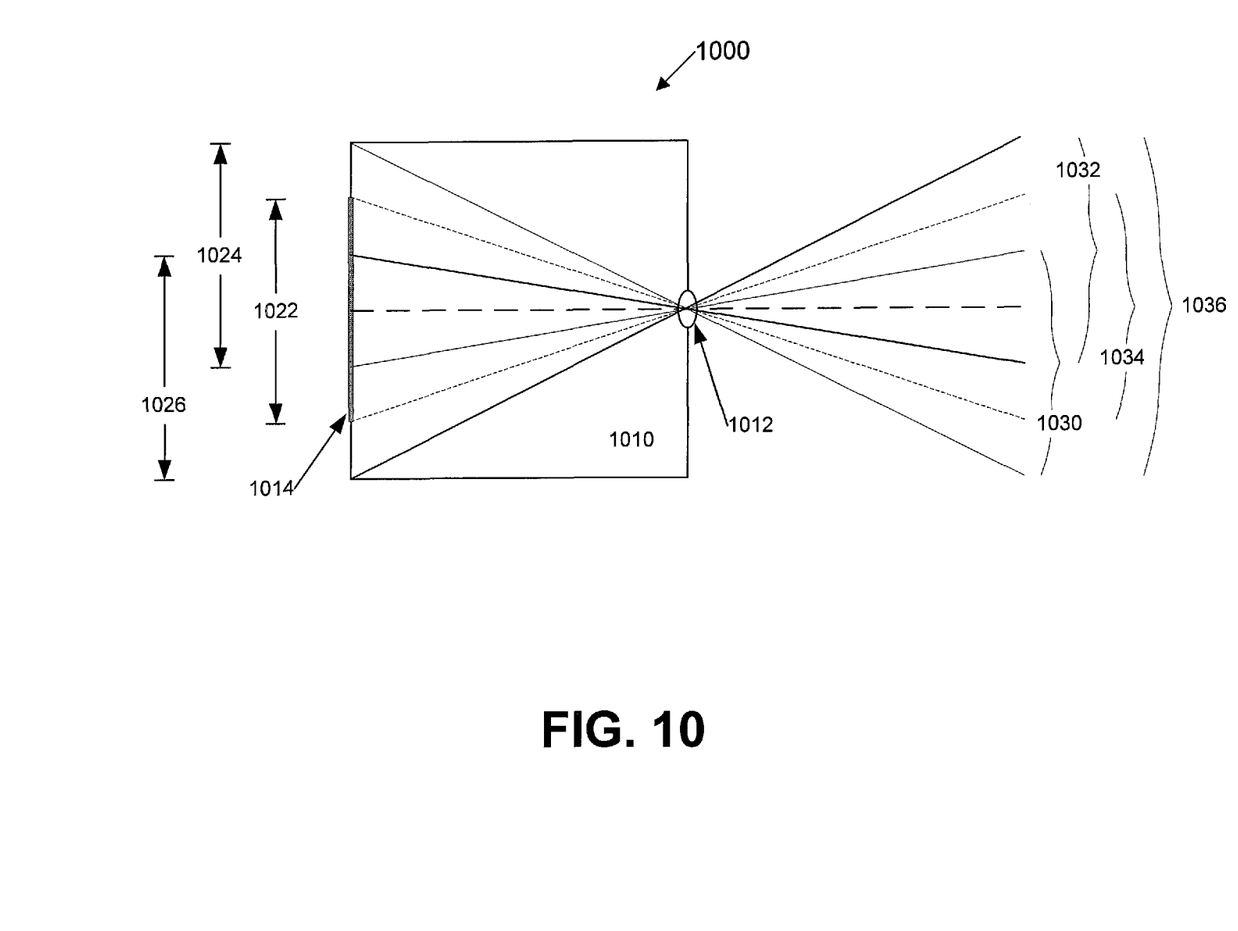
FIG. 10 shows an alternative implementation of a vertical adjustment of each eye's view made possible by vertically moving or sliding an image sensor.

FIG. 10 shows a stereoscopic camera system 1000 in accordance with an alternative implementation (alternative to FIG. 5). In the illustrated implementation of FIG. 10, a vertical adjustment of each eye's view is made possible by vertically moving or sliding an image sensor 1014. For example, the image sensor 1014 can be moved to: (1) the center (providing an effective sensor width 1022) to adjust a full field of view 1036 down to a vertical field of view 1034; (2) the top (providing an effective sensor width 1024) to adjust a full field of view 1036 down to a vertical field of view 1030; or (3) the bottom (providing an effective sensor width 1026) to adjust a full field of view 1036 down to a vertical field of view 1032.

A system similar to the stereoscopic camera system 1000 (shown in FIG. 10) using above-described techniques of sliding image sensors (horizontal and/or vertical) can be used to control optical centerlines to adjust for eccentricities of a lens which causes positional variations during zooming. The ability to digitally adjust each eye's view horizontally and/or vertically enables the camera system to compensate for the positional variations caused is by the lens eccentricities. In this implementation, the vertical sliding of an image sensor is used to compensate for lens eccentricities because the lens eccentricities cause mainly vertical variations. However, the horizontal sliding of an image sensor can also be used, in addition to the vertical sliding, to compensate for lens eccentricities which cause horizontal position variations. In one implementation, the camera system corrects for any lens eccentricity using a look-up table of sensor sliding values defined for the lens at various levels of zoom.

Figure 6:
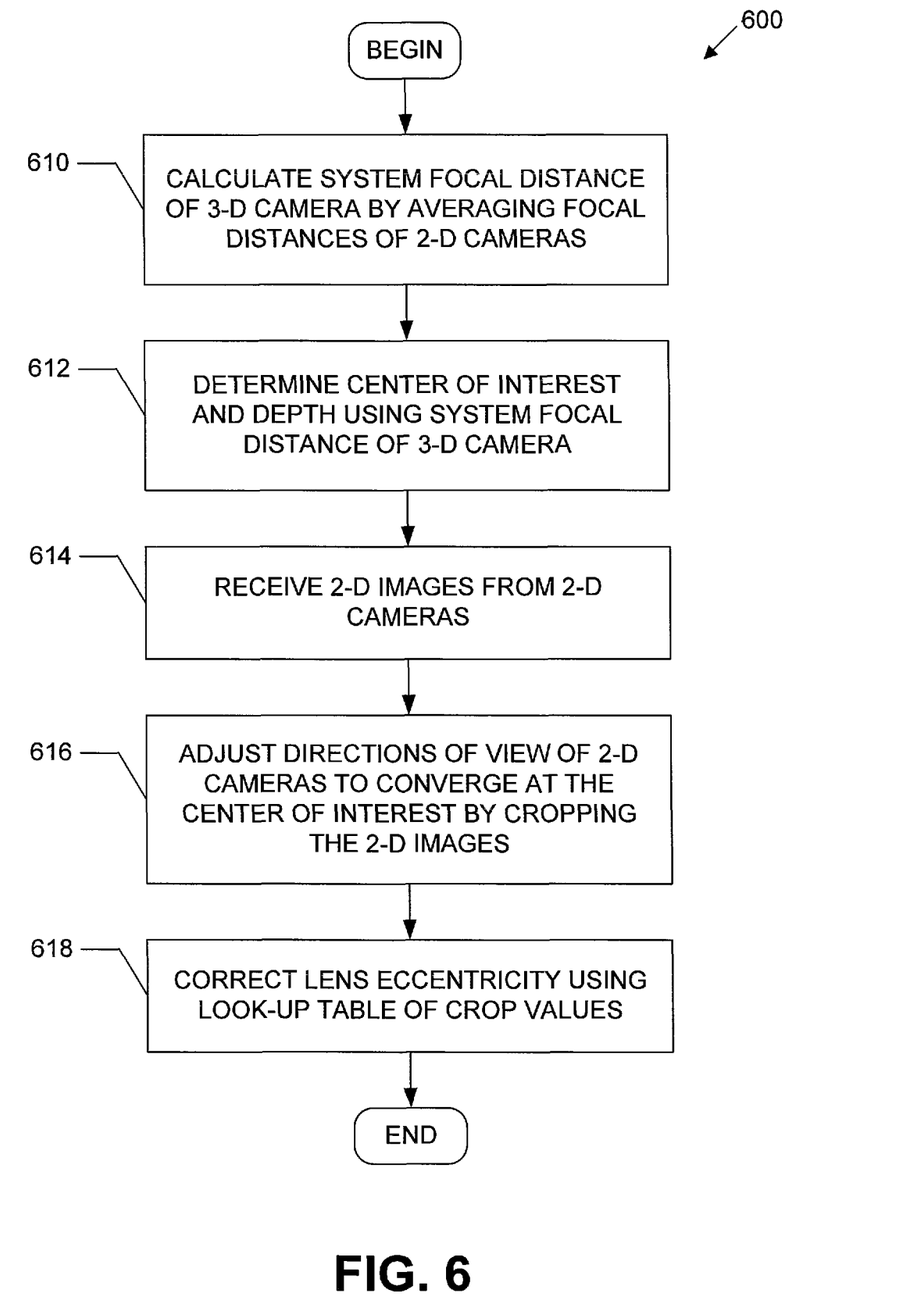
FIG. 6 is a flowchart illustrating a technique of automatically converging a plurality of images, which can be used in a stereoscopic camera system, in accordance with one implementation of the present invention.

FIG. 6 is a flowchart 600 illustrating a technique of automatically converging a plurality of images, in accordance with one implementation of the present invention. In one implementation, the plurality of images is automatically converged into a single stereoscopic image. In the illustrated implementation of FIG. 6, the system focal distance of the stereoscopic camera system is calculated, at box 610, by using the focal distances of images from 2-D cameras. In one implementation, the focal distance information is received by the processor of the stereoscopic camera system from the 2-D cameras.

From the result calculated in box 610, the center of interest and the depth plane are determined, at box 612. In one implementation, the center of interest is determined by averaging the focal distances of the two 2-D cameras. Thus, by having the auto-convergence be driven by the focal distance of the camera, the center of interest can be maintained at screen depth in a stereoscopic image (e.g., a 3-D image).

Once the center of interest is determined, the plurality of images which has been focused by the 2-D cameras is received, at box 614. The directions of view of the 2-D cameras are then adjusted to converge at the center of interest by cropping the received 2-D images, at box 616, as described above.

As mentioned above, the above-described techniques of cropping (horizontal and/or vertical) can be used to control optical centerlines to adjust for eccentricities of a lens which causes positional variations during zooming. The ability to digitally adjust each eye's view horizontally and/or vertically enables the camera system to compensate for the positional variations caused by the lens eccentricities. In one implementation, the camera system corrects for any lens eccentricity, at box 618, using a look-up table of crop values defined for the lens at various levels of zoom. The crop values include horizontal and/or vertical crop values needed to correct the lens eccentricity.

Figure 11:
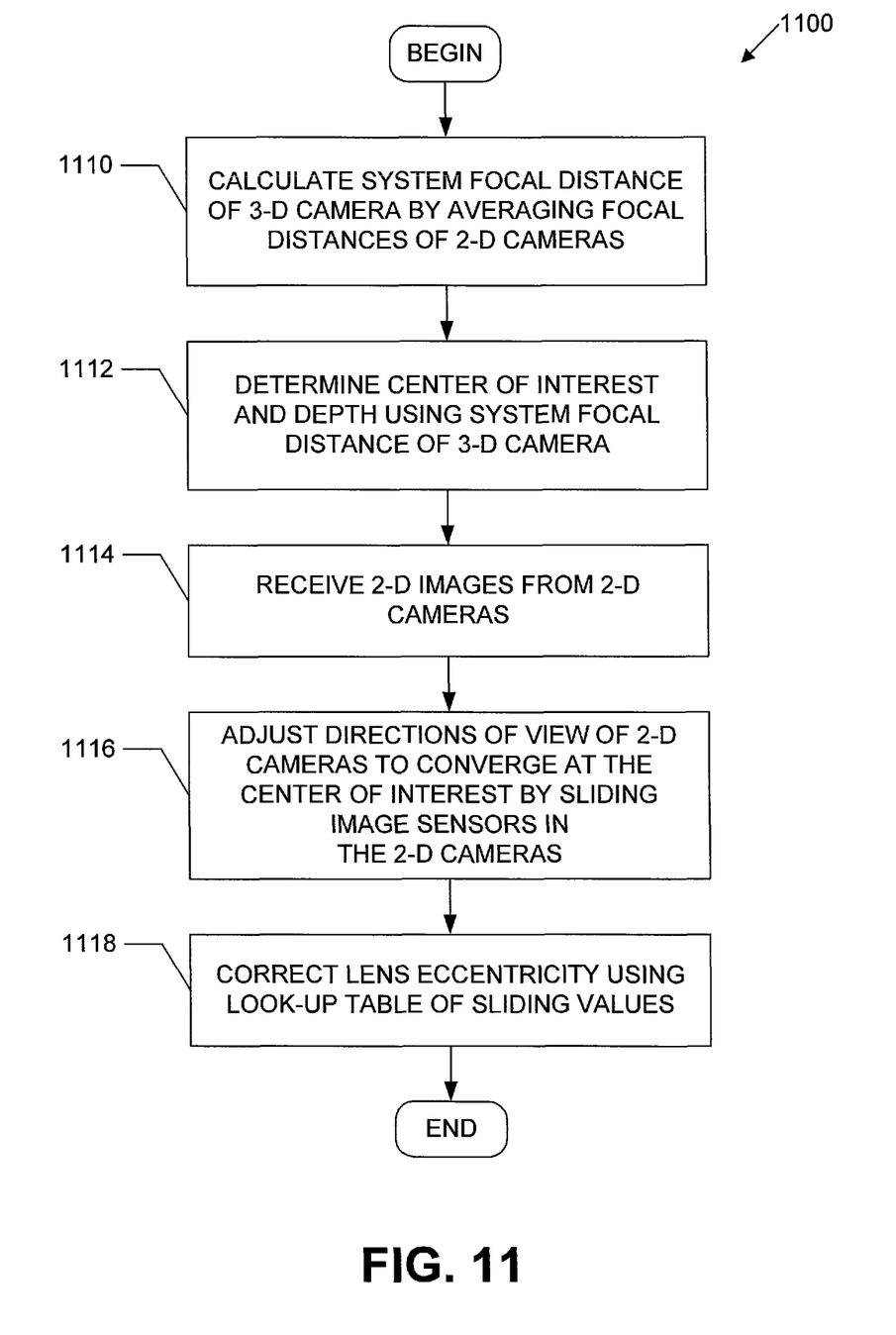
FIG. 11 is a flowchart illustrating a technique of automatically converging a plurality of images in accordance with an alternative implementation.

FIG. 11 is a flowchart 1100 illustrating a technique of automatically converging a plurality of images, in accordance with an alternative implementation of the present invention. In the illustrated implementation of FIG. 11, the system focal distance of the stereoscopic camera system is calculated, at box 1110, by using the focal distances of images from 2-D cameras. In one implementation, the focal distance information is received by the processor of the stereoscopic camera system from the 2-D cameras.

From the result calculated in box 1110, the center of interest and the depth plane are determined, at box 1112. In one implementation, the center of interest is determined by averaging the focal distances of the two 2-D cameras. Thus, by having the auto-convergence be driven by the focal distance of the camera, the center of interest can be maintained at screen depth in a stereoscopic image (e.g., a 3-D image).

Once the center of interest is determined, the plurality of images which has been focused by the 2-D cameras is received, at box 1114. The directions of view of the 2-D cameras are then adjusted to converge at the center of interest by sliding the image sensors in the 2-D cameras, at box 1116, as described above.

As mentioned above, the above-described techniques of sliding (horizontal and/or vertical) the images sensors can be used to control optical centerlines to adjust for eccentricities of a lens which causes positional variations during zooming. The ability to adjust each eye's view horizontally and/or vertically enables the camera system to compensate for the positional variations caused by the lens eccentricities. In one implementation, the camera system corrects for any lens eccentricity, at box 1118, using a look-up table of sensor sliding values defined for the lens at various levels of zoom. The sliding values include horizontal and/or vertical sliding values needed to correct the lens eccentricity.

Figure 7:
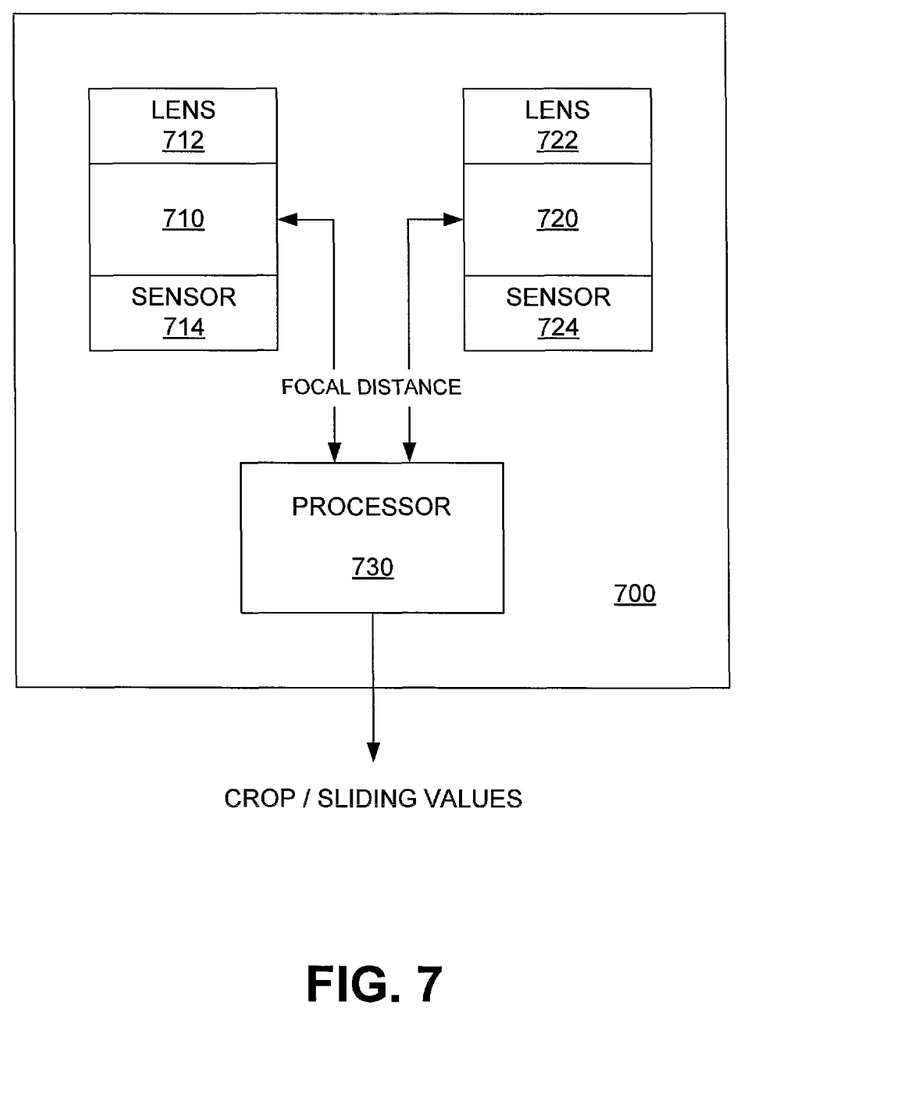
FIG. 7 is a block diagram of a stereoscopic camera system providing automatic convergence of a plurality of images, in accordance with one implementation of the present invention.

FIG. 7 is a block diagram of a stereoscopic camera system 700 providing automatic convergence of a plurality of images, in accordance with one implementation of the present invention. In one implementation, the plurality of images is automatically converged into a single stereoscopic image. The stereoscopic camera system 700 includes two 2-D cameras 710, 720 and a processor 730. The 2-D camera 710 includes a lens 712 which captures and projects an image on an image sensor 714. The 2-D camera 720 includes a lens 722 which captures and projects an image on an image sensor 724.

In the illustrated implementation of FIG. 7, focal distances of images from the 2-D cameras 710, 720 are received and processed by the processor 730 to calculate the focal distance of the stereoscopic camera system 700. The processor 730 then determines the center of interest and the depth plane from the calculated focal distance of the stereoscopic camera system 700. In one implementation, the center of interest is determined by averaging the focal distances of the two 2-D cameras. Thus, by having the auto-convergence be driven by the focal distance of the camera, the center of interest can be maintained at screen depth in a stereoscopic image (e.g., a 3-D image).

In one implementation, once the center of interest is determined, the processor 730 is configured to adjust the directions of view of the 2-D cameras 710, 720 to converge at the center of interest by calculating the crop values which can be used to crop the 2-D images, as described above. In an alternative implementation, the processor 730 is configured to adjust the directions of view of the 2-D cameras 710, 720 to converge at the center of interest by calculating the sliding values which can be used to slide the image sensors 714, 724.

Further, the processor 730 can perform cropping or sliding (horizontal and/or vertical) to control optical centerlines to adjust for eccentricities of a lens which causes positional variations during zooming. The ability to digitally adjust each eye's view horizontally and/or vertically enables the camera system to compensate for the positional variations caused by the lens eccentricities. In one implementation, the processor 730 corrects for any lens eccentricity using a look-up table of crop or sliding values defined for the lens at various levels of zoom.

Figure 8A:
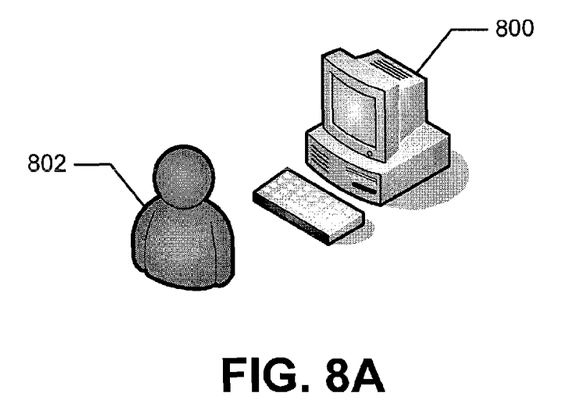
FIG. 8A illustrates a representation of a computer system and a user.

FIG. 8A illustrates a representation of a computer system 800 and a user 802. The user 802 uses the computer system 800 to perform automatic convergence of a plurality of images. The computer system 800 stores and executes a stereoscopic camera processing system 890.

Figure 8B:
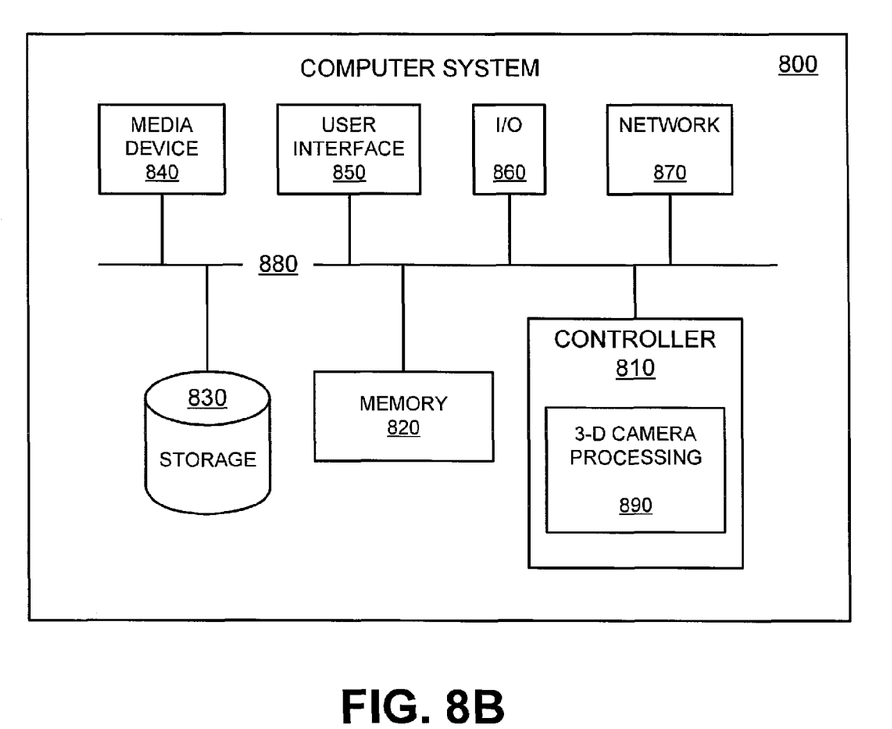
FIG. 8B is a functional block diagram illustrating the computer system hosting a stereoscopic camera processing system.

FIG. 8B is a functional block diagram illustrating the computer system 800 hosting the stereoscopic camera processing system 890. The controller 810 is a programmable processor and controls the operation of the computer system 800 and its components. The controller 810 loads instructions (e.g., in the form of a computer program) from the memory 820 or an embedded controller memory (not shown) and executes these instructions to control the system. In its execution, the controller 810 provides the stereoscopic camera processing system 890 as a software system, such as to provide the automatic convergence calculations (e.g., determining what cropping or sliding to use and how to crop the image data or slide the image sensor). Alternatively, this service can be implemented as separate hardware components in the controller 810 or the computer system 800.

Memory 820 stores data temporarily for use by the other components of the computer system 800. In one implementation, memory 820 is implemented as RAM. In one implementation, memory 820 also includes long-term or permanent memory, such as flash memory and/or ROM.

Storage 830 stores data temporarily or long term for use by other components of the computer system 800, such as for storing data used by the stereoscopic camera processing system 890. In one implementation, storage 830 is a hard disk drive.

The media device 840 receives removable media and reads and/or writes data to the inserted media. In one implementation, for example, the media device 840 is an optical disc drive.

The user interface 850 includes components for accepting user input from the user of the computer system 800 and presenting information to the user. In one implementation, the user interface 850 includes a keyboard, a mouse, audio speakers, and a display. The controller 810 uses input from the user to adjust the operation of the computer system 800.

The I/O interface 860 includes one or more I/O ports to connect to corresponding I/O devices, such as external storage or supplemental devices (e.g., a printer or a PDA). In one implementation, the ports of the I/O interface 860 include ports such as: USB ports, PCMCIA ports, serial ports, and/or parallel ports. In another implementation, the I/O interface 860 includes a wireless interface for communication with external devices wirelessly.

The network interface 870 includes a wired and/or wireless network connection, such as an RJ-45 or "Wi-Fi" interface (including, but not limited to 802.11) supporting an Ethernet connection.

The computer system 800 includes additional hardware and software typical of computer systems (e.g., power, cooling, operating system), though these components are not specifically shown in FIG. 8B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. For example, the illustrated implementations discuss using two offset image sensors. In other implementations, the sensors are not offset but instead more of the image is cropped (this implementation will likely also use more image sensor material). Similarly, while the illustrated implementation discusses converging two 2-D images into a single stereoscopic image, more than two 2-D images can be converged into the resultant stereoscopic image. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of automatically converging a plurality of images for use in a stereoscopic camera system including a plurality of 2-D cameras, the method comprising:
   receiving a focal distance from each 2-D camera of the plurality of 2-D cameras,
      wherein each 2-D camera includes a lens and at least one image sensor;
   calculating a system focal distance of the stereoscopic camera system by averaging focal distances received from the plurality of 2-D cameras;
   determining a center of interest using the calculated system focal distance of the stereoscopic camera system; and
   moving the at least one image sensor in each 2-D camera by sliding the at least one image sensor in opposite directions while keeping the lens stationary in each 2-D camera to adjust directions of view of the plurality of 2-D cameras to converge the plurality of images at the center of interest,
      wherein sliding the at least one image sensor in opposite directions has a same effect as horizontally cropping each of the plurality of images on opposite sides of the plurality of images,
      wherein the plurality of images is projected onto the at least one image sensor.

2. The method of claim 1, wherein the stereoscopic camera system further comprises
   a processor configured to automatically converge the plurality of images captured by the plurality of 2-D cameras.

3. The method of claim 1, wherein the plurality of 2-D cameras comprises
   two 2-D cameras which are displaced by an inter-pupillary distance from each other,
      wherein each 2-D camera includes a lens and an image sensor.

4. The method of claim 3, wherein moving the at least one image sensor in each 2-D camera comprises
   sliding the image sensor in each 2-D camera in toward the middle of the inter-pupillary distance to focus on distant objects, while sliding the image sensor in each 2-D camera out away from the middle of the inter-pupillary distance to focus on near objects.

5. The method of claim 1, wherein moving the at least one image sensor includes
   horizontally sliding the at least one image sensor of each 2-D camera to adjust directions of view of the plurality of 2-D cameras to converge at the center of interest; and
   further comprising
   vertically sliding the at least one image sensor of each 2-D camera to adjust for eccentricities of lenses in the plurality of 2-D cameras.

6. A stereoscopic camera system for automatically converging a plurality of images, the system comprising:
   a plurality of 2-D cameras including a first 2-D camera and a second 2-D camera,
      wherein the first 2-D camera comprises a first lens which captures and projects a first image of the plurality of images on a first image sensor, and the second 2-D camera comprises a second lens which captures and projects a second image of the plurality of images on a second image sensor; and
   a processor configured to:
   (1) receive and process focal distances of the plurality of images from the plurality of 2-D cameras to calculate a system focal distance of the stereoscopic camera system by averaging the focal distances;
   (2) determine a center of interest using the calculated system focal distance of the stereoscopic camera system; and
   (3) move the first image sensor and the second image sensor in opposite directions to adjust directions of view of the plurality of 2-D cameras while keeping the first lens and the second lens stationary in each 2-D camera to converge the plurality of images at the center of interest,
      wherein moving the first image sensor and the second image sensor in opposite directions has same effect as horizontally cropping each of the plurality of images on opposite sides of the plurality of images,
      wherein the plurality of images is projected onto the first image sensor and the second image sensor.

7. The system of claim 6, wherein the processor is configured to horizontally slide the first image sensor and the second image sensor in opposite directions to control the directions of view of the first image and the second image to converge at the center of interest.

8. The system of claim 7, wherein the processor is further configured to vertically slide the first image sensor and the second image sensor to adjust for eccentricities of lenses in the plurality of 2-D cameras.

9. A stereoscopic camera system for automatically converging a plurality of images, comprising:
   a plurality of 2-D cameras, each 2-D camera comprising a lens which captures and projects an image onto an image sensor; and
   a processor configured to:
   (1) vertically move the image sensor in each 2-D camera to adjust for eccentricities of lenses in the plurality of 2-D cameras;
   (2) receive and process focal distances of the plurality of images to calculate a system focal distance of the stereoscopic camera system by averaging the focal distances;
   (3) determine a center of interest using the calculated system focal distance of the stereoscopic camera system; and
   (4) horizontally slide the image sensor in each 2-D camera in opposite directions while keeping the lens stationary in each 2-D camera to adjust directions of view of the plurality of 2-D cameras to converge the plurality of images at the center of interest,
      wherein sliding the image sensor in each 2-D camera in opposite directions has same effect as horizontally cropping each of the plurality of images on opposite sides of the plurality of images,
      wherein the plurality of images is projected onto the image sensor in each 2-D camera.

10. The system of claim 9, wherein the processor is configured to horizontally move the image sensor in each 2-D camera to adjust for eccentricities of lenses in the plurality of 2-D cameras.

11. The system of claim 9, wherein the processor is configured to adjust for eccentricities of each lens in each of the plurality of 2-D cameras using a look-up table of movement values defined for the lens at various levels of zoom.

12. A non-transitory computer-readable storage medium storing a computer program for automatically converging a plurality of images for use in a stereoscopic camera system including a plurality of 2-D cameras, the computer program comprising executable instructions that cause a computer to:
- receive a focal distance from each 2-D camera of the plurality of 2-D cameras,
- wherein each 2-D camera includes a lens and at least one image sensor;
- calculate a system focal distance of the stereoscopic camera system by using averaging focal distances received from the plurality of 2-D cameras;
- determine a center of interest using the calculated system focal distance of the stereoscopic camera system; and
- command the at least one image sensor in each 2-D camera to move by sliding the at least one image sensor in opposite directions while keeping the lens stationary in each 2-D camera to adjust directions of view of the plurality of 2-D cameras to converge the plurality of images at the center of interest,
- wherein sliding the at least one image sensor in each 2-D camera in opposite directions has same effect as horizontally cropping each of the plurality of images on opposite sides of the plurality of images,
- wherein the plurality of images is projected onto the at least one image sensor.

13. The non-transitory computer-readable storage medium of claim 12, wherein the executable instructions that cause a computer to receive a focal distance from each 2-D camera of the plurality of 2-D cameras comprise executable instructions that cause a computer to:
- receive metadata from each 2-D camera of the plurality of 2-D cameras; and
- extract the focal distance from the received metadata.

* * * * *